T. LESLIE.
Improvement in Revolving Flower Stands.
No. 120,078. Patented Oct. 17, 1871.
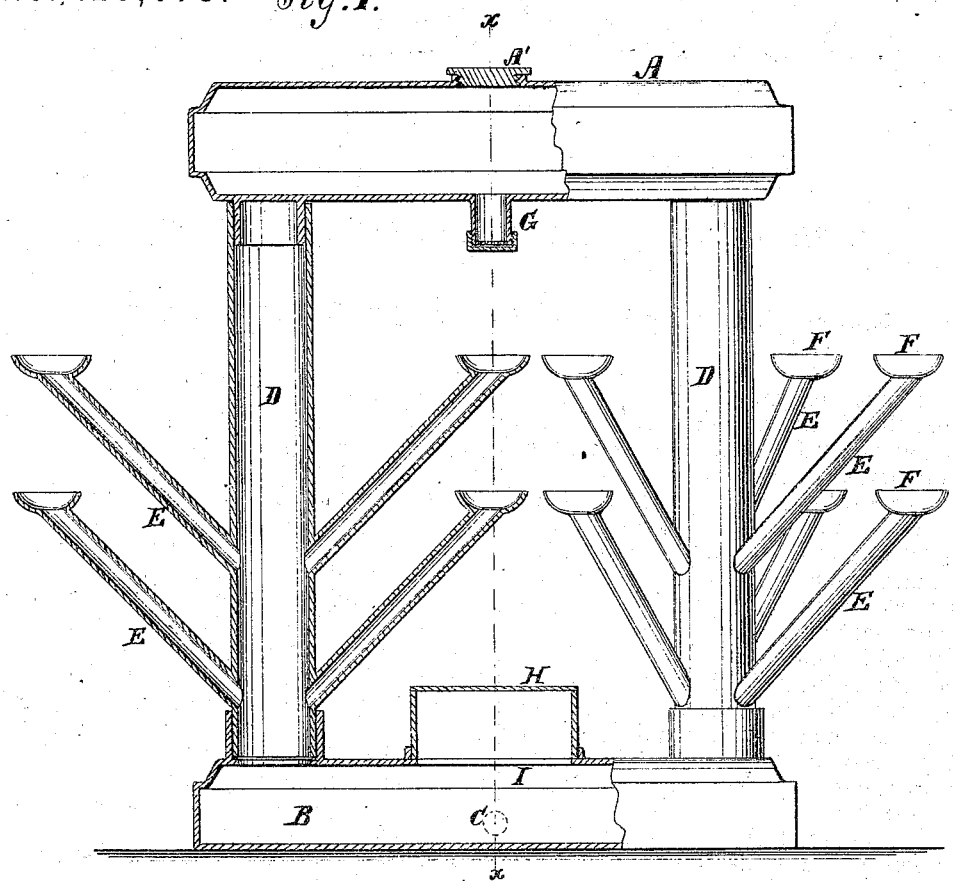
Fig. 1.
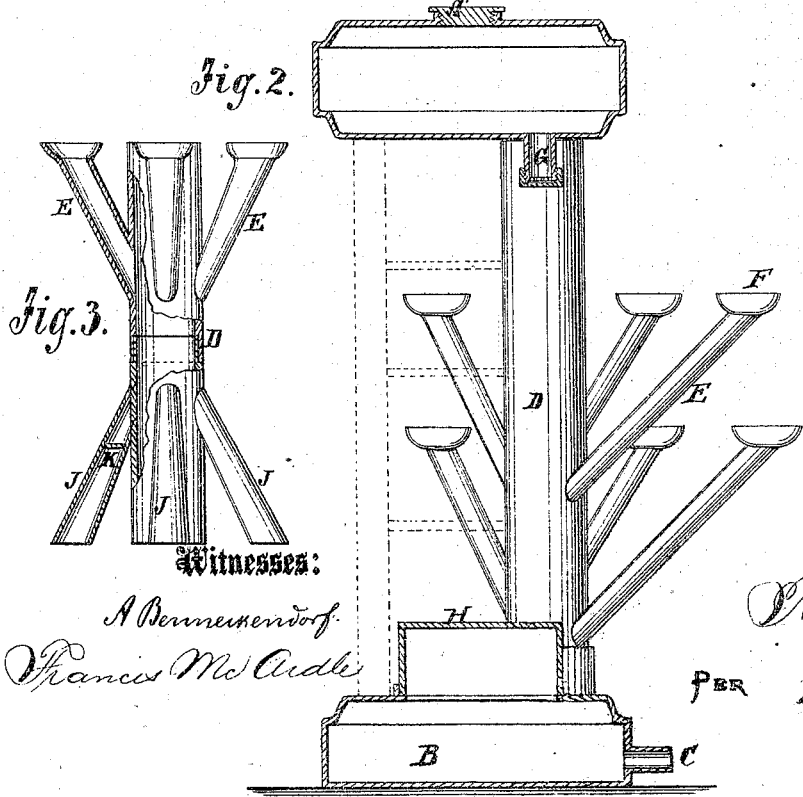
Fig. 2.
Fig. 3.
Witnesses:
A. Bennersendorf
Francis McArdle
Inventor:
T. Leslie
per
Munn & Co.
Attorneys.

UNITED STATES PATENT OFFICE.

THOMAS LESLIE, OF BROOKLYN, NEW YORK.

IMPROVEMENT IN REVOLVING FLOWER-STANDS.

Specification forming part of Letters Patent No. 120,078, dated October 17, 1871.

*To all whom it may concern:*

Be it known that I, THOMAS LESLIE, of Brooklyn, in the county of Kings and State of New York, have invented certain new and useful improvements in portable watering apparatus and revolving combination flower-pot stands; and I do hereby declare that the following is a full, clear, and exact description thereof, which will enable others skilled in the art to make and use the same, reference being had to the accompanying drawing forming part of this specification.

The object of this invention is to furnish a convenient apparatus for supporting flower-pots and watering the same, and which may be used for various other purposes; and it consists in the construction, arrangement, and combination of parts hereinafter described.

Figure 1 is a sectional elevation. Fig. 2 is a vertical section of Fig. 1 taken on the line $x\ x$. Fig. 3 is a modification of the columns D having limbs E and also limbs J for holding water, each having a water-tight bottom, K. When this column is reversed or changed end for end it is a flower-stand, and may be used for that purpose separately, if desired.

Similar letters of reference indicate corresponding parts.

A is a water-reservoir, which may be connected by a pipe with the water-main by the tube A'. B is a water-tank having a discharge-tube, C. D D are hollow revolving columns by which the reservoir A and the tank B are connected. The columns are closed at top and open at bottom to discharge water into the tanks. E represents tubular limbs connected with the columns D; more or less in number, and standing at an angle with the columns of about forty-five degrees, as seen in the drawing. F represents cups or the top ends of the limbs E, in which flower-pots or other articles may be placed. G is a tube in the reservoir through which water is discharged. A hose may be attached to this tube, on the end of which is a rose-head or sprinkler for watering the flowers. The surplus water runs down through the limbs and is discharged into the tank B. H is a glass casing over the aperture I in the tank. This tank may be used as an aquarium if desired. By a modification, as seen in dotted lines in Fig. 1, shelves may be arranged for supporting flower-pots, and when the limbs E are not required for supporting flower-pots the apparatus may be placed in a hall and used as an umbrella or hat-stand, or for other purposes.

I do not, therefore, confine myself, in the application of my invention, to a flower-pot stand exclusively, but design to use it for all the purposes for which it may be adapted.

Having thus described my invention, I claim as new and desire to secure by Letters Patent—

1. The arrangement and combination of the reservoir A, tank B, revolving columns D D, and limbs E, substantially as described.

2. The cups F, in combination with the limbs E, as shown and described.

3. The combination of the tubular limbs E with the revolving columns D D, as described.

THOMAS LESLIE.

Witnesses:
T. B. MOSHER,
ALEX. F. ROBERTS.